United States Patent
Yoshida et al.

(10) Patent No.: US 6,971,706 B2
(45) Date of Patent: Dec. 6, 2005

(54) SIDE STRUCTURE OF A VEHICLE

(75) Inventors: Motoki Yoshida, Hiroshima (JP);
Takashi Niseki, Hiroshima (JP);
Noriaki Fujie, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/806,316

(22) Filed: Mar. 23, 2004

(65) Prior Publication Data

US 2004/0189045 A1    Sep. 30, 2004

(30) Foreign Application Priority Data

Mar. 25, 2003  (JP) .............................. 2003-081675

(51) Int. Cl.⁷ ................................................ B60J 5/06
(52) U.S. Cl. ................ 296/155; 296/146.2; 296/146.9; 296/146.16
(58) Field of Search ............................ 296/155, 146.1, 296/147, 146.2, 146.9, 146.16; 49/502

(56) References Cited

U.S. PATENT DOCUMENTS

| | | | |
|---|---|---|---|
| 5,454,618 A | | 10/1995 | Sullivan |
| 5,557,888 A | * | 9/1996 | Ruchat et al. ................. 49/362 |
| 5,906,405 A | * | 5/1999 | Cooper ..................... 296/97.22 |
| 6,196,618 B1 | * | 3/2001 | Pietryga et al. ......... 296/146.11 |
| 6,206,455 B1 | * | 3/2001 | Faubert et al. ............... 296/155 |
| 6,220,650 B1 | * | 4/2001 | Davis et al. ............ 296/146.16 |
| 6,270,148 B1 | * | 8/2001 | Noda et al. ................... 296/155 |
| 6,328,374 B1 | * | 12/2001 | Patel ........................... 296/155 |
| 6,382,705 B1 | * | 5/2002 | Lang et al. ............. 296/146.12 |
| 6,729,072 B1 | * | 5/2004 | Somnay et al. ................ 49/362 |
| 6,776,450 B2 | * | 8/2004 | Okubo et al. ............. 296/146.9 |
| 2001/0006298 A1 | * | 7/2001 | Tsubokura et al. ........... 296/155 |
| 2003/0085593 A1 | | 5/2003 | Shuto et al. | |

FOREIGN PATENT DOCUMENTS

| | | |
|---|---|---|
| JP | 2000-160907 | 6/2000 |
| JP | 2002364238 | 4/2003 |

* cited by examiner

*Primary Examiner*—H. Gutman
(74) *Attorney, Agent, or Firm*—Nixon Peabody LLP; Donald R. Studebaker

(57) ABSTRACT

A side structure of a vehicle in which a rear periphery, formed correspondingly in position to an area where a second window opening area is located, is positioned at the rear side of a second rear periphery formed at the lower side of the first rear periphery. When slide door is fully opened, the longitudinal length between a front periphery and the first rear periphery is larger than the length between the front periphery and the second rear periphery. For a rear periphery of the slide door, when the slide door is fully closed, a lower portion, substantially corresponding in position to the second rear periphery, is located in front of an upper portion, substantially corresponding in position to the first rear periphery.

5 Claims, 7 Drawing Sheets

SIDE STRUCTURE OF A VEHICLE

TECHNICAL FIELD OF THE INVENTION

The present invention is directed to a side structure of a vehicle, and more particularly to a sliding door within a side structure of a vehicle.

BACKGROUND OF THE INVENTION

Conventionally, vehicles have included a sliding door provided with vertically movable window panes. However, such vehicles suffer from the following drawback. When a passenger, for example a child, carelessly puts his/her hand or head through an opening area in the window, when the slide door is opened with the window pane lowered, his/her hand or head may be pinched between a rear periphery of a opening area for the slide door and a front periphery of the opening area for the window.

As Japanese publication of patent application no. 2000-160907 has described, it is known to employ a stopper mechanism to restrict the slide movement of the slide door while the window pane is lowered. The stopper mechanism thus prevents the above-mentioned pinching drawback.

The forgoing publication, however, requires the employment of a stopper mechanism which results in the increase in the number of the parts and accompanying labor cost for mounting the parts, thereby increasing cost of the vehicle. Moreover, this increases the weight of the vehicle causing additional disadvantages.

The pinching drawback may also be structurally avoided by forming the rear portion of the slide door in such a way that the overall rear periphery of the slide door opening area is displaced to rear side of the front periphery of the window opening, even with the sliding door being fully opened. This enlarges a gap between the rear periphery of the opening area for the slide door and the front periphery of the opening area for the window to accommodate any protruding hand or head, even when the slide door is fully opened. However, this causes other problems such as an increase in the weight of the slide door since the slide door is enlarged correspondingly to the enlarged opening area for the slide door.

SUMMARY OF THE INVENTION

In view of the above-noted problems, an object of the present invention is to provide a side structure of a vehicle comprising a slide door functioning as an open-close mechanism for a vertically opening window pane, which prevents pinching without the stopper mechanism and also from the increase in the weight of the slide door.

According to an exemplary embodiment of the present invention, the object is achieved by a side structure of a vehicle that includes a slide door opening area formed in the side wall of the vehicle, a slide door slidable to freely open and close the slide door opening area, a window opening area formed at the upper portion of the slide door, a window pane elevated and lowered to freely open and close the window opening area, wherein, a rear periphery of the slide door opening area comprises a first rear periphery formed substantially corresponding in position to an area where the window opening area is arranged and a second rear periphery formed below the first rear periphery with respect to the vehicular vertical direction, the first rear periphery being located at the rear side (i.e., behind) of the second rear periphery with respect to the vehicles longitudinal direction, the slide door is slidable to a position where a front periphery of the window opening area substantially corresponds in position to the second rear periphery of the slide door opening area, the longitudinal length between the front periphery of the window opening area and the first rear periphery is greater than the longitudinal length between the front periphery of the window opening area and the second rear periphery in the fully-opened condition of the slide door, and a lower portion of the rear periphery of the slide door substantially corresponding in position to the second rear periphery is located in front of an upper portion substantially corresponding in position to the first rear periphery in the fully-closed condition of the slide door.

Accordingly, the vehicular longitudinal length between the front periphery and the first rear periphery of the window opening area is longer than that between the front periphery and the second rear periphery of the window opening area, when the slide door is fully opened. This prevents any pinching as opposed to when the first rear periphery and the second rear periphery are located at same position as each other. Thus, safety is improved. Additionally, the second rear periphery of the slide door opening area is positioned in front of the first rear periphery.

Thus, the slide door should not necessarily be formed so that the lower portion of the rear periphery of the slide door that corresponds in position to the second rear periphery and the upper portion of the rear periphery of the slide door that corresponds in position to the first rear periphery are located at the same position as each other with respect to the vehicular longitudinal direction. This enables the lower portion to be put forward, resulting in the shortened longitudinal length of the slide door for the decrease in the weight of the slid door.

Preferably, the slide door may be provided with a center roller, the vehicle side structure may be provided with a center rail located in vertically intermediate position of the side wall of the vehicle and slidably supporting the center roller, and the center rail may extend between the second rear periphery and a rear end of the vehicle.

For easing ingress and egress of the driver and passenger, the rear periphery of the slide door opening area is enlarged toward the rear side so that the longitudinal length of the slide door opening area is extended. However, this shortens the longitudinal length of the side wall of the vehicle between the rear periphery of the slide door opening area and the rear end of the vehicle, resulting in the shortened length of a center rail which is arranged in the side wall so as to support the slide door in a freely slidable manner. Therefore, the amount of the slide or the slidable length of the slide door is limited, so that the slide door opening area is insufficiently ensured. To this, the first rear periphery, arranged correspondingly in position to the window opening area, is designed so as to be located rearward of (i.e., behind) the second rear periphery provided in vehicular lower side of the first rear periphery, as described above.

This ensures the larger longitudinal length of the vehicular side rearward of the second rear periphery. In the forgoing structure, the center rail extends from the first rear periphery to the rear end of the vehicle body. This provides the longer center rail, because the center rail is elongated forward beyond the position of its front end in the case that the center rail extends from the first rear periphery positioned rearward of the second rear periphery. Therefore, the slide door opening area can be extended in its longitudinal width.

More preferably, a weather-strip may be provided being attached along the peripheral of the slide door opening area, wherein, the slide door opening area may include in its periphery a connecting portion connected to the first rear periphery at one end and connected to the second rear periphery at the other end, the connecting portion may be formed to curve down and forward from the position that corresponds in height to the upper periphery of the window pane in the state where the window pane is lowered down to the maximum, toward the second rear periphery, and the weather-strip may be disposed so as to curve down and forward along the shape of the connecting portion.

Generally, if a weather-strip is bent at a small angle, its sealing performance is degraded, so that it may insufficiently prevent from the infiltration of rain, water, or the like. To this, according to the forgoing structure, the connecting portion is formed to slantingly extend downwardly from the position that corresponds in height to the upper periphery of the window pane in the state where the window pane is lowered down to the maximum, toward the second rear periphery. This enables the weather-strip to be arranged to curve more gradually as compared to the case where the connecting portion is horizontally formed, preventing from the degradation in the sealing performance of the weather-strip at the connecting portion.

Alternatively, a weather-strip may be provided being attached along the peripheral of the slide door opening area, wherein, the slide door opening area may include in its periphery a connecting portion connected to the first rear periphery at one end and connected to the second rear periphery at the other end, the connecting portion may be formed to curve down and forward from the position that corresponds in height to the upper periphery of the window pane in the state where the second window pane is lowered down to the maximum, toward the position that corresponds in height to the location of the center rail, and the weather-strip may be disposed so as to curve down and forward along the shape of the connecting portion.

According to the structure, a long center rail is ensured. In addition, the connecting portion is formed to slantingly extend downwardly from the position that corresponds in height to the upper periphery of the window pane in the state where the window pane is lowered down to the maximum, toward the position that corresponds in height to the center rail. This enables the weather-strip to be arranged to carve more gradually as compared to the case where the connecting portion is horizontally formed, preventing from degradation in the sealing performance of the weather-strip at the connecting portion.

As described above, according to the present invention, in a slide door functioning as an open-close mechanism for a window pane by vertical movement, pinching is prevented without increasing the weight of the slide door and without employing an additional stopper mechanism.

These and other objects, features, aspects, and advantages of the present invention will become more apparent from the following detailed description of the preferred embodiment relative to the accompanying drawings.

DETAILED DESCRIPTION OF THE INVENTION

Figure 1:
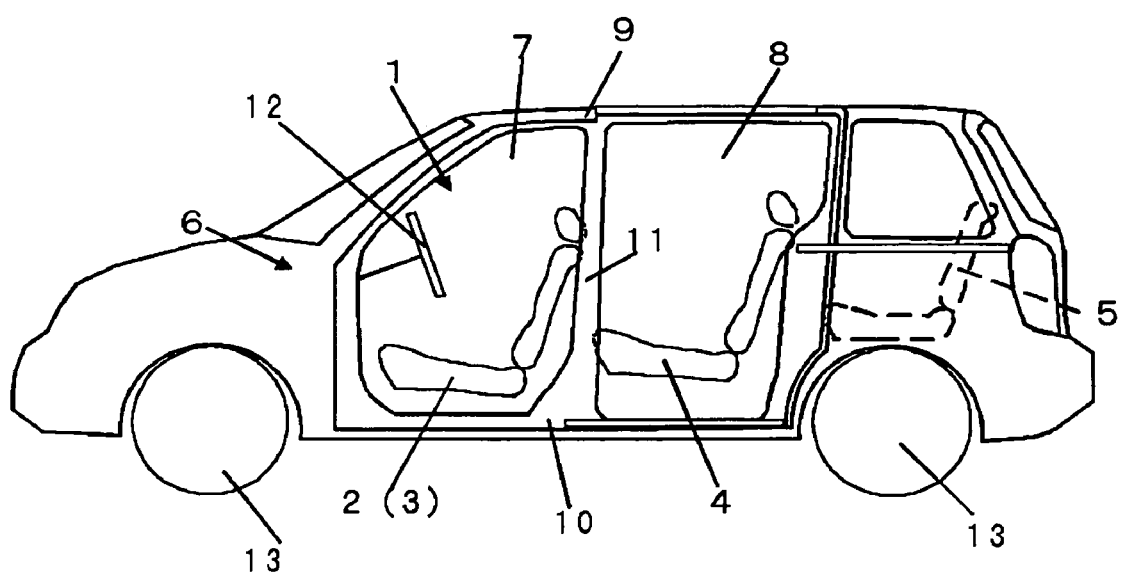
FIG. 1 is a side view of the side structure of the vehicle in accordance with an embodiment of the present invention, with a door for a front seat and a slide door being removed.

An exemplary embodiment of the present invention will now be described with reference to the drawings. FIG. 1 is a side view of the side structure of the vehicle in accordance with an embodiment of the present invention, with a door for a front seat and a slide door being removed, FIG. 2 is a side view of the side structure of the vehicle in accordance with an embodiment of the present invention, and FIG. 3 is a side view of the side structure of the vehicle in the situation where each of a first window opening and a second window opening are fully opened in accordance with an embodiment of the present invention.

As shown in FIG. 1, in a passenger compartment 1, there are disposed: a front row of seats 3 comprising a driver seat 2 and a front passenger seat (not shown); a second row of seats 4 located rearward of the front seats 3; and a third row of seats 5 located rearward of the second seat 4. A side wall 6 of the vehicle is provided with a first door opening area 7 for use of the ingress and egress to the driver seat 2, and a second door opening area 8 for use of the ingress and egress to the second row seat 4 and the third row seat 5. A center pillar 11 vertically extends so as to provide a partition between the first door opening area 7 and the second door opening area 8. One end portion of the center pillar 11 is joined with a roof side rail 9, and the other end portion of the center pillar 11 is joined with a side sill 10. In addition, the reference numeral 12 indicates a steering wheel, and the reference numerals 13 indicate tires.

Figure 2:
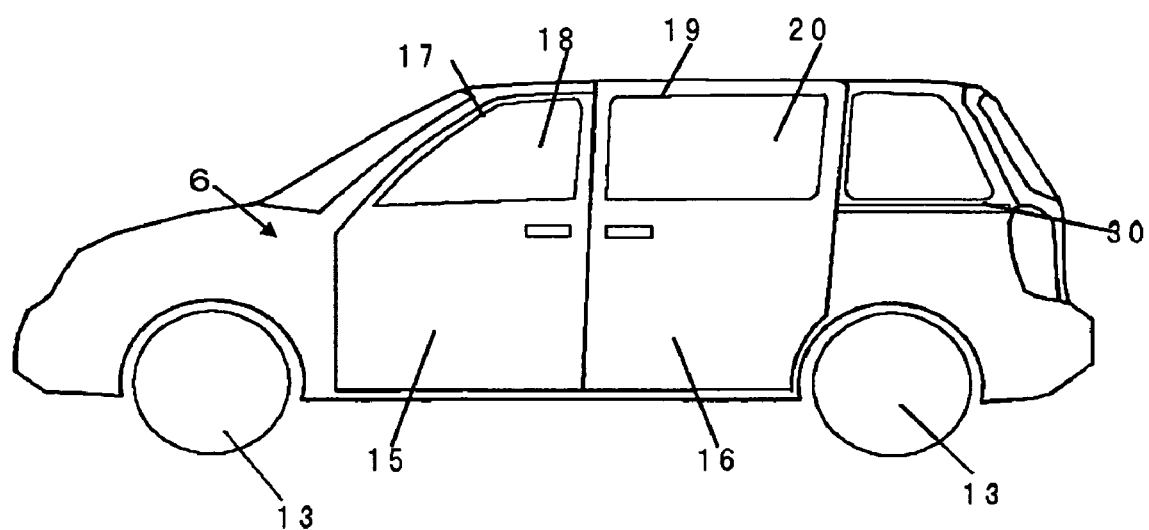
FIG. 2 is a side view of the side structure of a vehicle in accordance with an embodiment of the present invention.

As shown in FIG. 2, a door 15 for the front seat is mounted to the first door opening area 7 (refer to FIG. 1) via a hinge (not shown) so as to be freely opened or closed. Moreover, a slide door 16 is arranged for the second door opening area 8 (refer to FIG. 1) so as to freely slide as will be described below.

Figure 3:
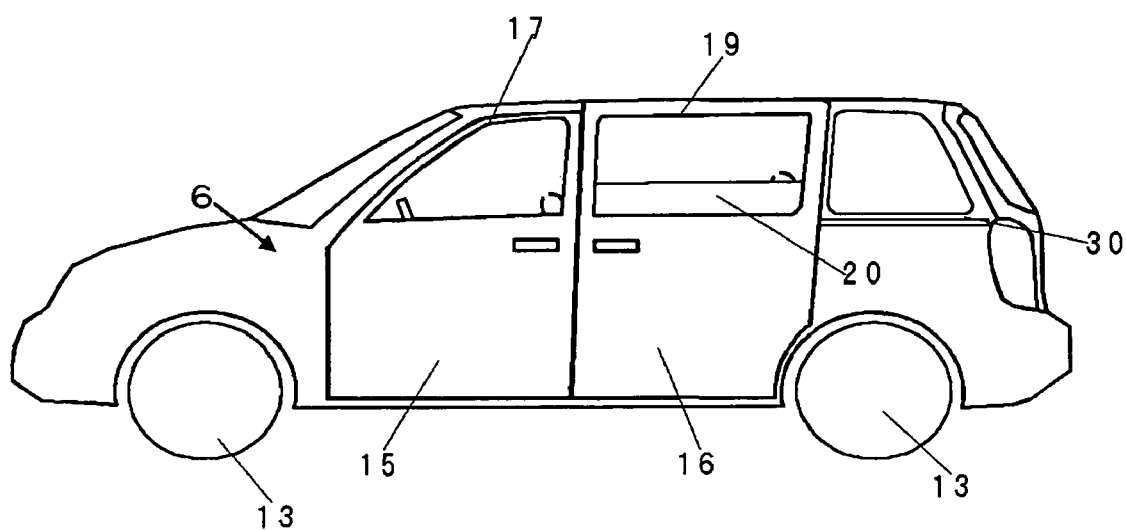
FIG. 3 is a side view of a vehicle in the situation where each of a first window opening and a second window opening are fully opened in accordance with an embodiment of the present invention.

As shown in FIGS. 2 and 3, a first window opening area 17 is formed in the upper portion of the door 15 for the front seat, and a first window pane 18 is mounted in the first window opening area 17 so as to be elevated and lowered by a regulator not shown to open and close freely the area. The first window pane 18 is allowed to fully open the overall first window opening area 17. Similarly, a second window opening area 19 is formed in the upper portion of the slide door 16, and a second window pane 20 is mounted in the second window opening area 19 so as to be elevated and lowered by a regulator not shown to open and close freely the area. The second window pane 20 is allowed to be lowered down to a position slightly above the lower periphery for the second window opening area 19, leaving the second window opening area 19 being partly unopened.

Figure 4:
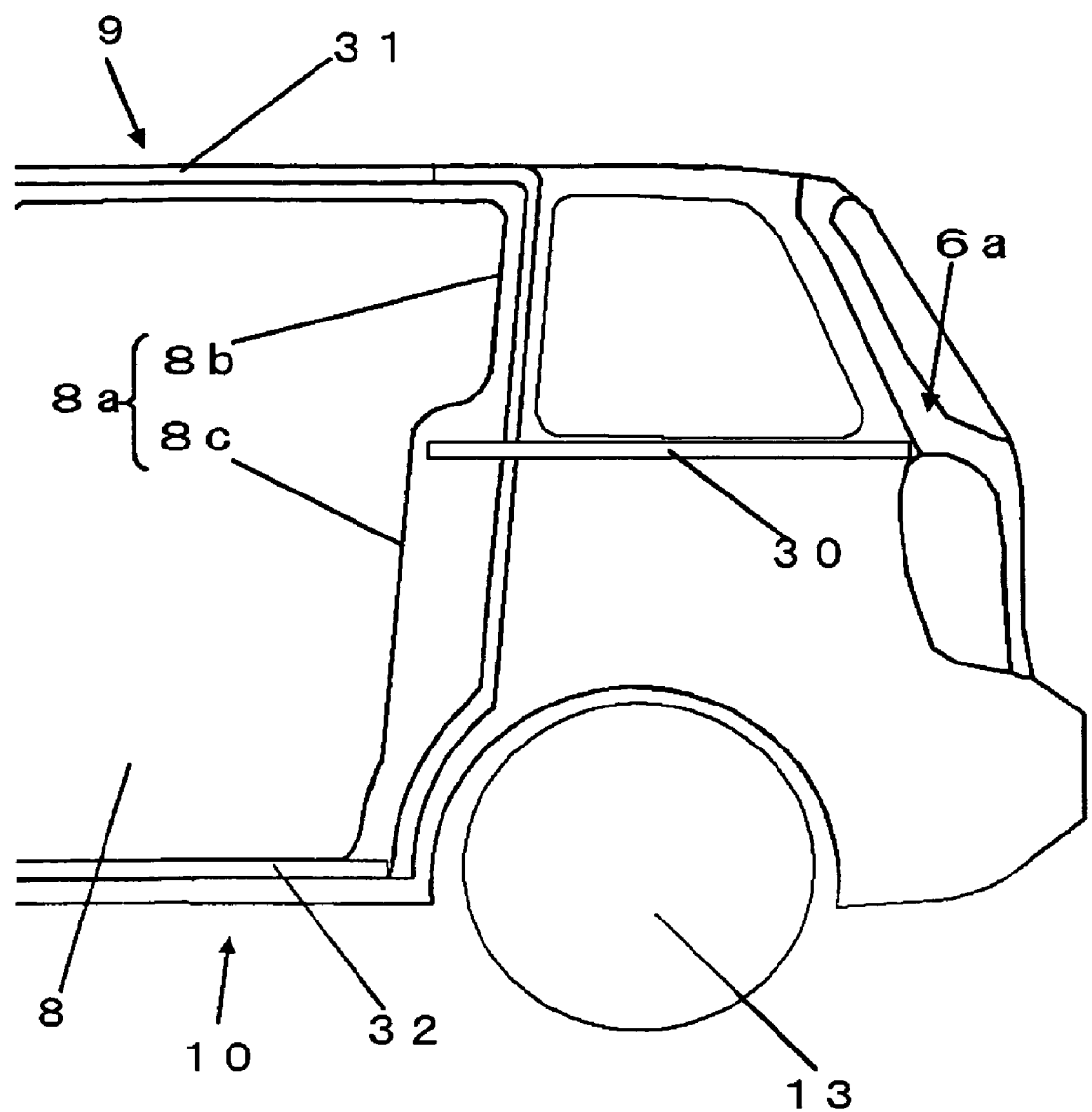
FIG. 4 is a side view of a second door opening area in accordance with an embodiment of the present invention.
Figure 5:
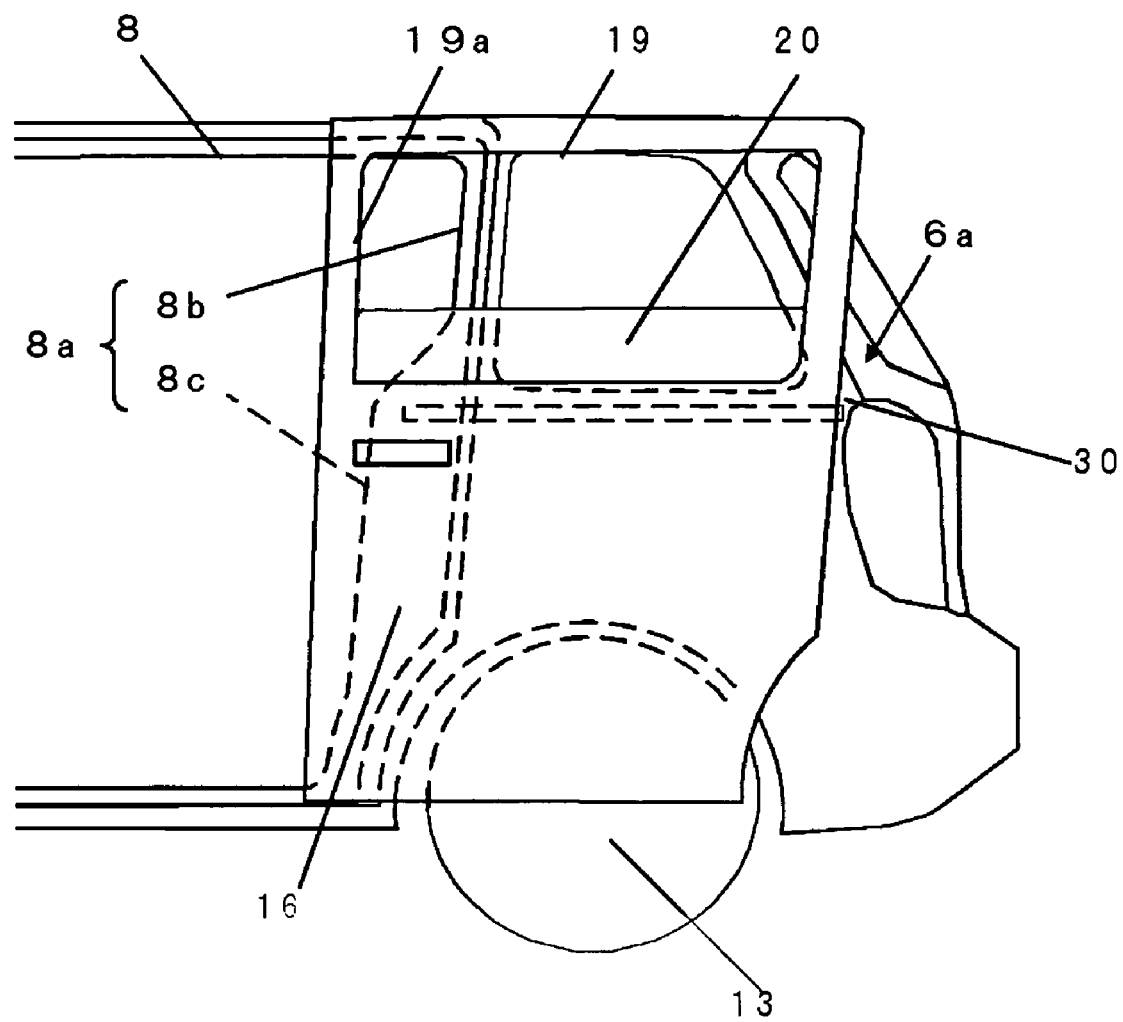
FIG. 5 is a side of view of the second door opening area with the slide door being fully open in accordance with the embodiment of the present invention
Figure 6:
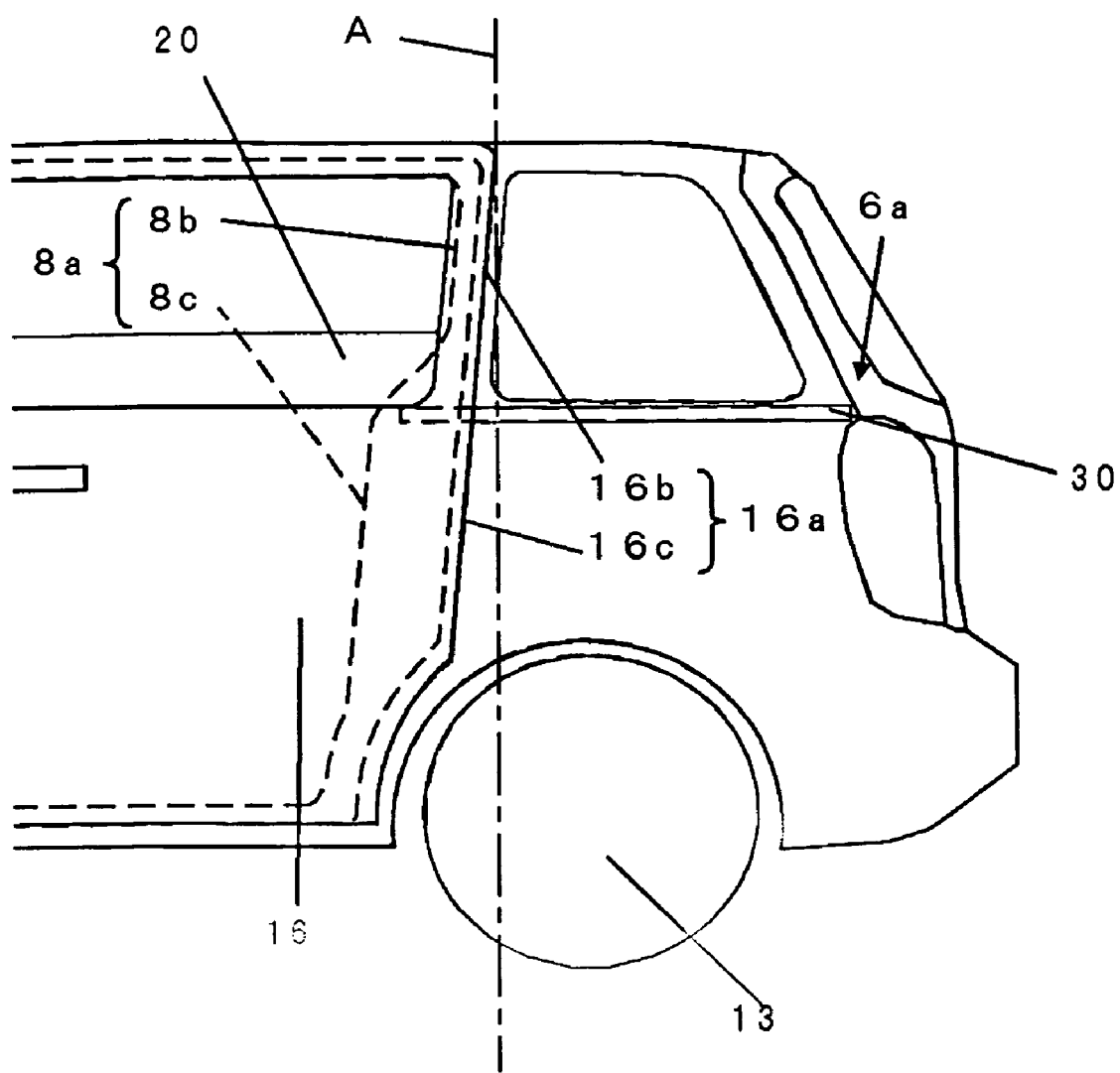
FIG. 6 is a side of view of the second door opening area with the slide door being fully closed in accordance with the embodiment of the present invention.

FIG. 4 is a side view of the second door opening area in accordance with the embodiment of the present invention, FIG. 5 is a side of view of the second door opening area with the slide door being fully open in accordance with the embodiment of the present invention, and FIG. 6 is a side of view of the second door opening area with the slide door being fully closed in accordance with the embodiment of the present invention. Next, the second door opening area 8 will be described in detail.

As shown in FIGS. 4 and 5, the rear periphery 8a for the second door opening area 8 comprises a first rear periphery 8b and a second rear periphery 8c. The first rear periphery 8b corresponds, in position, to the area where the second window opening area 19 is formed. Particularly, the first rear periphery 8b extends substantially vertically, and constitutes the upper portion above the upper edge of the second window pane 20 with the second window opening area 19 being opened to the maximum, as shown in FIG. 5. The second rear periphery 8c extends substantially vertically and constitutes the lower portion below the first rear periphery 8b. Here, the slide door 16 is allowed to slide up to the position where the front periphery 19a of the second window opening area 19 corresponds in position to the second rear periphery 8c. The first rear periphery 8b is located at the rear side (e.g., behind) of the second rear periphery 8c with respect to the vehicular longitudinal direction, with the upper portion of the second door opening area 8 being wider than the lower portion thereof. Therefore, as shown in FIG. 5, when the slide door 16 is fully opened, the longitudinal length of the gap between the front periphery 19a of the second window opening area 19 and the first rear periphery 8b is longer than that between the front periphery 19a of the second window opening area 19 and the second rear periphery 8c.

The longitudinal length of the gap between the front periphery 19a of the second window opening area 19 and the first rear periphery 8b is defined so that the head of a passenger clears the gap generally (approximately 130 mm, or more).

As shown in FIG. 6, the rear periphery 16a of the slide door 16 comprises a lower portion 16c approximately corresponding in position to the second rear periphery 8c and the upper portion 16b approximately corresponding in position to the first rear periphery 8b. Thus, the lower portion 16c is arranged in front of the upper portion 16b. Accordingly, the rear periphery 16a of the slide door 16, over its upper portion 16b and lower portion 16c, is formed so as to be inclined forward at a predetermined angle relative to the vertical line shown as A in FIG. 6. In the embodiment, both the lower portion 16c and upper portion 16b are formed in straight lines in shape. Instead, they may be formed in better correspondence in shape with the first rear periphery 8b and second rear periphery 8c.

Figure 7:
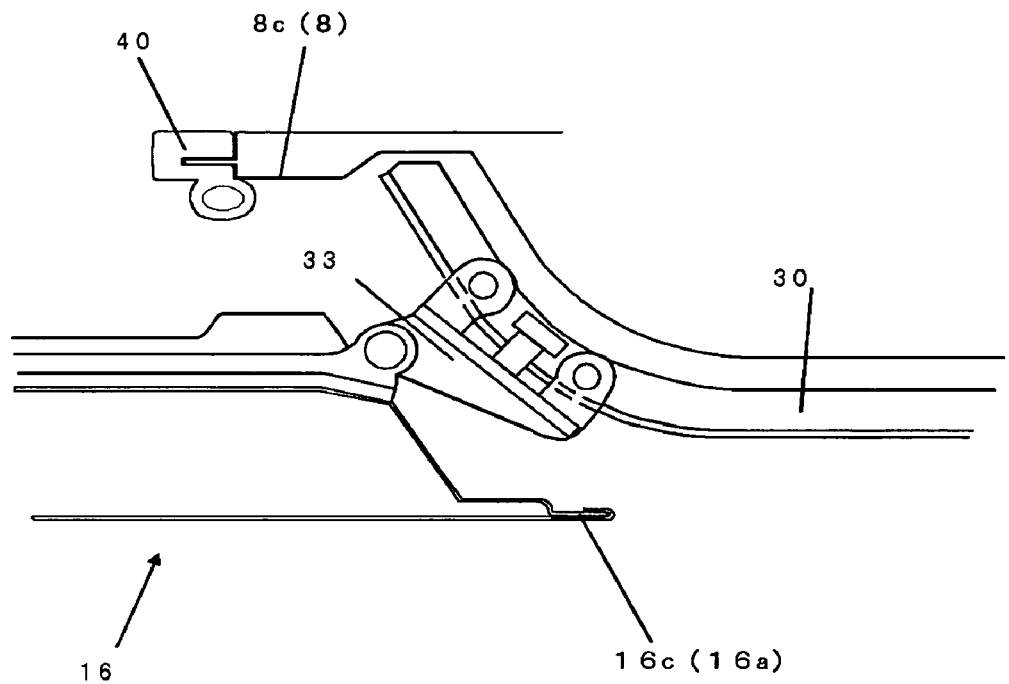
FIG. 7 is a schematic plane view of a center roller and a center rail in accordance with an embodiment of the present invention.
Figure 8:
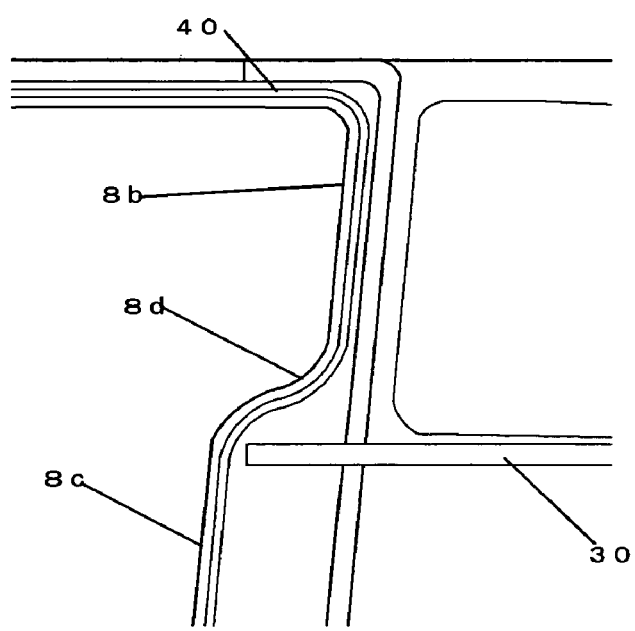
FIG. 8 is a side view of a first rear periphery and a second rear periphery of a second door opening area in accordance with an embodiment of the present invention.

FIG. 7 is a schematic plan view of a center roller and a center rail in accordance with an embodiment of a present invention. Next, a slide mechanism of the slide door 16 will be described in detail as below. As shown in FIG. 7, the center rail 30 is disposed extending from the second rear periphery 8c of the second door opening area 8 to a rear end 6a of vehicle (refer to FIGS. 4, 5, and 6). The center roller 33, slidable within the center rail 30, is provided at the lower portion 16c of the rear periphery 16a in the slide door 16 that corresponds in position to the center rail 30. Similarly, as shown in FIG. 4, a roof rail 31 is provided in a roof side rail 9 and a side-sill rail 32 is provided in the side-sill 10. The slide door 16 coupled to each of the rails is attached with rollers supported in a freely slidable manner by the respective rails. With these rails and rollers, the slide door 16 is supported so as to slide freely. FIG. 8 is a side view of the first rear periphery 8b and second rear periphery 8c of the second door opening area 8 in accordance with the embodiment of the present invention. As shown in FIG. 8, a connecting portion 8d is connected to the first rear periphery 8b at one end and is connected to the second rear periphery 8c at the other end. The connecting portion 8d curves down and forward of the first rear periphery 8b (the portion that corresponds in height to the upper periphery of the second window pane 20 (refer to FIG. 5, 6) in the state where the second window pane 20 is lowered down to the maximum) toward the portion of the second rear periphery 8c that corresponds in height to the center rail 30. That is, the connecting portion 8d is formed to gradually curve from the first rear periphery 8b toward the second rear periphery 8c. A weather-strip 40 is disposed along and over the periphery of the second door opening area 8. Thus, the weather-strip 40 is disposed so as to curve gradually along the connecting portion 8d.

Next, the action and the effect of the embodiment will be described.

The vehicular longitudinal length between the front periphery 19a for the second window opening area 19 and the first rear periphery 8b is designed larger than that between the front periphery 19a for the second window opening area 19 and the second rear periphery 8c. As a result, this prevents pinching by the slide movement of the slide door 16 more reliably for improving safety as compared to the case where the first rear periphery 8b is located at the position of the second rear periphery 8c with respect to longitudinal direction. Moreover, in the rear periphery 16a of the slide door 16, the lower portion 16c is located forward of the upper portion 16b. This shortens the vehicular longitudinal length of the lower portion 16c of the slide door 16, thereby decreasing the weight of the slide door 16.

The center rail 30 extends from the second rear periphery 8c, resulting in the center rail 30 extending forward beyond the position of its front end in the case with the center rail 30 extending from the first rear periphery 8b located at rear side of the second rear periphery 8c. This lengthens the center rail 30, so that the longitudinal length of the second door opening area 8 is widened.

The connecting portion 8d extends from the position that corresponds in height to the upper periphery of the second window glass 20 (refer to FIGS. 5 and 6) with the second window pane 20 lowered down to the maximum, toward the position that corresponds in height to the center rail 30. Therefore, the weather-strip 40 is arranged to curve more gradually as compared to the case where the connecting portion 8d is horizontally formed, allowing the weather-strip 40 to be curved less tightly. This prevents degradation in sealing performance of the weather-strip 40 at the connecting portion 8d.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A side structure of a vehicle comprising:
   a slide door opening area formed at the side wall of the vehicle,
   a slide door slidable to freely open and close the slide door opening area, a window opening area formed at the upper portion of the slide door, a window pane elevated and lowered to freely open and close the window opening area, wherein, a rear periphery of the slide door opening area comprises a first rear periphery formed substantially corresponding in position to an area where the window opening area is arranged, which is located above an upper edge of said window pane in the sate where the window pane is lowered down to the maximum, and a second rear periphery formed below the first rear periphery with respect to the vehicular vertical direction, said first rear periphery extends substantially vertically and extends upward from a position that corresponds in height to the upper periphery of the window pane in the sate where the window pane is lowered down to the maximum, said first rear periphery being located behind said second rear periphery with respect to the vehicle's longitudinal direction, the slide door is slidable to a fully opened position where a front periphery of the window opening area substantially corresponds in position to said second rear periphery of the slide door opening area, the longitudinal length between said front periphery of the window opening area and said first rear periphery is greater than the longitudinal length between said front periphery of the window opening area and said second rear periphery in a fully-opened condition of the slide door, and a weather-strip is attached along the rear periphery of the slide door opening area, wherein the slide door opening area includes in the rear periphery a connecting portion connected to said first rear periphery at one end and connected to said second rear periphery at the other end, said connecting portion is formed to curve down and forward from a position that corresponds in height to the upper periphery of the window pane in the state where the window pane is lowered down to the maximum, toward said second rear periphery, and said weather-strip is disposed so as to extend slantingly downward along the shape of said connecting portion.

2. A side structure of a vehicle claimed in claim 1, further comprising a center rail located in vertically intermediate position of the side wall of the vehicle and extending between said second rear periphery and a rear end of the vehicle, and a center roller provided at the slide door and slidably supported by the center rail.

3. A side structure of a vehicle comprising:

a slide door opening area formed at the side wall of the vehicle, a slide door slidable to freely open and close the slide door opening area, a window opening area formed at the upper portion of the slide door, a window pane elevated and lowered to freely open and close the window opening area, wherein, a rear periphery of the slide door opening area comprises a first rear periphery formed substantially corresponding in position to an area where the window opening area is arranged and a second rear periphery formed below the first rear periphery with respect to the vehicular vertical direction, said first rear periphery extends substantially vertically and extends upward from a position that corresponds in height to the upper periphery of the window pane in the state where the window pane is lowered down to the maximum, said first rear periphery being located behind said second rear periphery with respect to the vehicle's longitudinal direction, the slide door is slidable to a fully opened position where a front periphery of the window opening area substantially corresponds in position to said second rear periphery of the slide door opening area, the longitudinal length between said front periphery of the window opening area and said first rear periphery is greater than the longitudinal length between said front periphery of the window opening area and said second rear periphery in a fully-opened condition of the slide door, and a rear periphery of said slide door substantially comprises an upper portion substantially corresponding in position to said first rear periphery and a lower portion substantially corresponding in position to said second rear periphery, the rear periphery of said slide door being substantially inclined forward at a predetermined angle relative to a vertical line of the vehicle such that the lower portion of the rear periphery of said slide door is located in front of the upper portion of the rear periphery of said slide door.

4. A side structure of a vehicle claimed in claim 3, wherein said rear periphery of the slide door comprising said upper portion and said lower portion is substantially formed in a straight line so as to be inclined.

5. A side structure of a vehicle claimed in claim 3, further comprising a center rail located in vertically intermediate position of the side wall of the vehicle and extending between said second rear periphery and a rear end of the vehicle, and a center roller provided at the slide door and slidably supported by the center rail.

* * * * *